US010113606B1

(12) United States Patent
Asnani

(10) Patent No.: US 10,113,606 B1
(45) Date of Patent: Oct. 30, 2018

(54) VIBRATION RING

(71) Applicant: The United States of America as represented by the Administrator of the National Aeronautics and Space Administration, Washington, DC (US)

(72) Inventor: Vivake M. Asnani, North Olmsted, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 14/529,650

(22) Filed: Oct. 31, 2014

Related U.S. Application Data

(60) Provisional application No. 61/907,557, filed on Nov. 22, 2013.

(51) Int. Cl.
| | |
|---|---|
| *F16F 15/18* | (2006.01) |
| *F16F 13/00* | (2006.01) |
| *F16F 1/02* | (2006.01) |
| *F16F 15/10* | (2006.01) |

(52) U.S. Cl.
CPC ............... *F16F 13/00* (2013.01); *F16F 1/02* (2013.01); *F16F 15/10* (2013.01)

(58) Field of Classification Search
CPC ........ F16F 15/005; F16F 15/007; F16F 15/18; F16F 2224/0283; F16F 15/10; F16F 15/12; F16H 7/0829; F16H 7/0838; F16H 7/1209; F16H 7/1245; F16H 57/006; F16H 2057/0012; Y10S 73/04
See application file for complete search history.

(56) References Cited

U.S. PATENT DOCUMENTS

| | | | | |
|---|---|---|---|---|
| 3,611,831 | A * | 10/1971 | O'Neill | F16F 15/18 188/379 |
| 3,980,911 | A * | 9/1976 | English | H01L 41/053 310/348 |
| 4,845,688 | A * | 7/1989 | Butler | G10K 9/121 367/163 |
| 4,976,553 | A * | 12/1990 | Yamaguchi | H02N 2/043 101/93.05 |
| 5,185,543 | A | 2/1993 | Tebbe | |
| 5,660,256 | A | 8/1997 | Gallmeyer et al. | |
| 5,742,561 | A * | 4/1998 | Johnson | H04R 23/00 310/334 |
| 6,520,678 | B2 | 2/2003 | Aiken et al. | |
| 6,606,922 | B2 | 8/2003 | Case et al. | |
| 6,773,197 | B2 | 8/2004 | Urbach | |
| 6,889,803 | B2 | 5/2005 | Schankin et al. | |

(Continued)

OTHER PUBLICATIONS

Sahoo, et al., "Fabrication of Simple and Ring-Type Piezo Actuators and Their Characterization", 2012, Hindawi Publishing Corportion, vol. 2012, Article ID 821847, p. 1-4.*

*Primary Examiner* — Thomas W Irvin
(74) *Attorney, Agent, or Firm* — Robert H. Earp, III; William M. Johnson

(57) ABSTRACT

A vibration ring is provided to remove vibratory energy from a machine driveline. The vibration ring includes a compression cage configured to generate vibratory excitation within a material. The material is configured to generate an electric charge dissipated through or harvested by an electric circuit.

20 Claims, 5 Drawing Sheets

(56) References Cited

U.S. PATENT DOCUMENTS

| | | |
|---|---|---|
| 6,927,528 B2 * | 8/2005 | Barillot ................ H02N 2/0095 |
| | | 310/325 |
| 6,938,515 B2 | 9/2005 | Glockner et al. |
| 7,004,291 B2 | 2/2006 | Schankin et al. |
| 7,475,761 B2 | 1/2009 | Fischer |
| 7,780,155 B2 | 8/2010 | Capdepuy et al. |
| 8,186,490 B2 | 5/2012 | Melz et al. |
| 8,517,842 B2 | 8/2013 | Exner |
| 9,739,353 B2 * | 8/2017 | Kraus .................... F16H 21/44 |
| 2002/0075574 A1 * | 6/2002 | Sorg ..................... F16F 15/005 |
| | | 359/819 |
| 2013/0180350 A1 * | 7/2013 | Kraus .................... F16H 21/44 |
| | | 74/108 |

\* cited by examiner

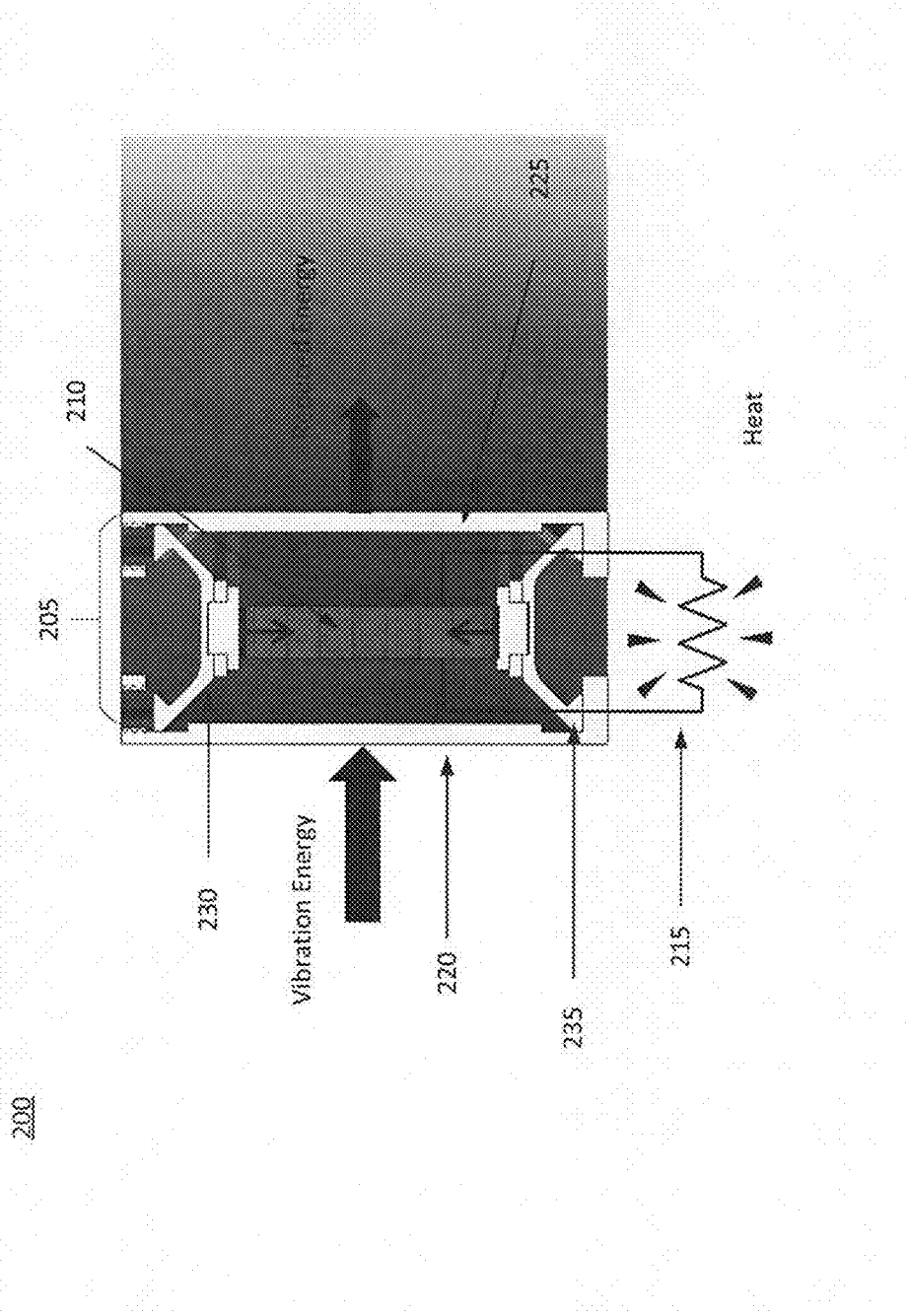

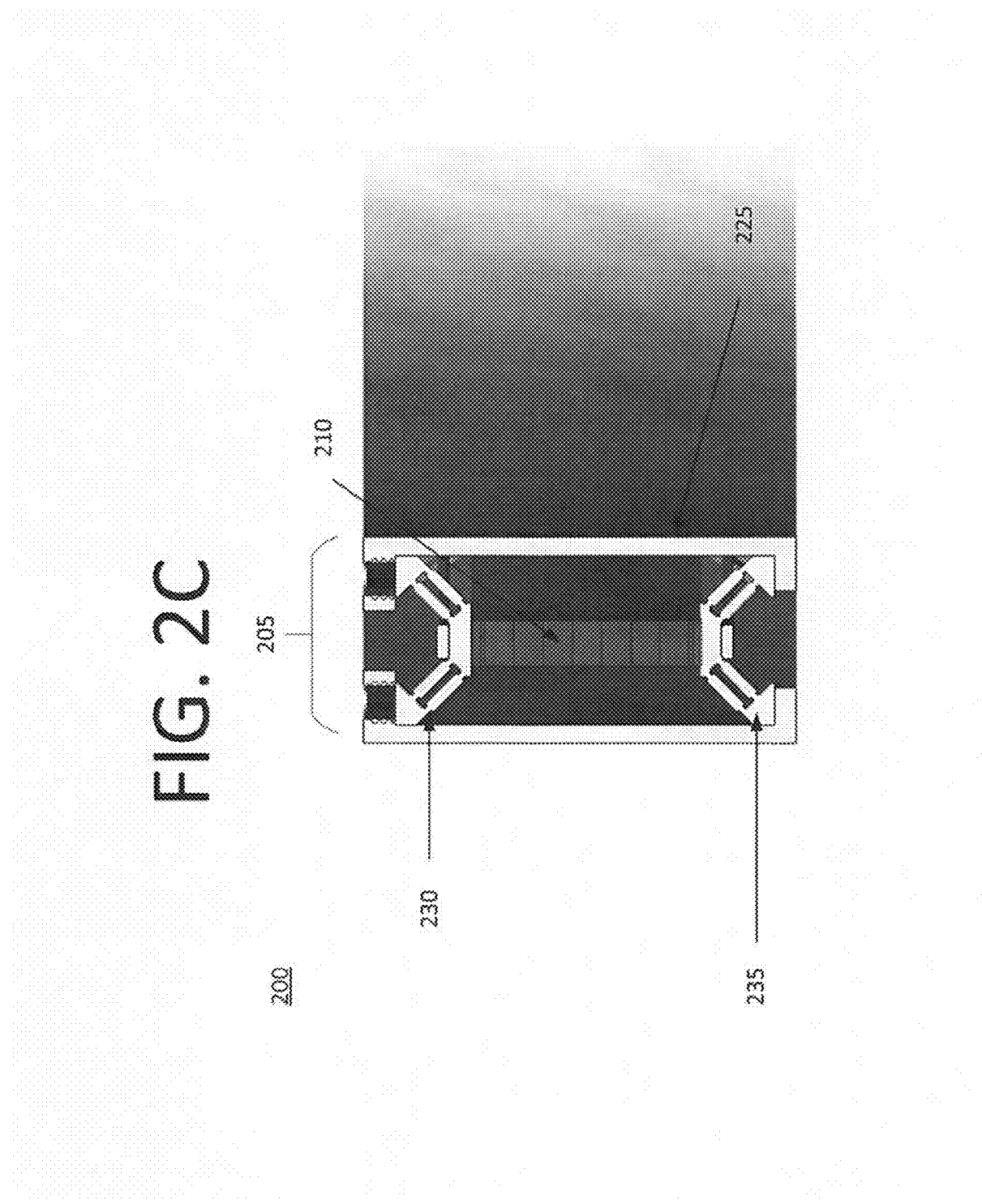

VIBRATION RING

CROSS REFERENCE TO RELATED APPLICATION

This application is a non-provisional of, and claims priority to, U.S. Provisional Patent Application Ser. No. 61/907,557 filed Nov. 22, 2013. The subject matter of this earlier-filed application is hereby incorporated by reference in its entirety.

ORIGIN OF THE INVENTION

The invention described herein was made by employees of the United States Government and may be manufactured and used by or for the Government for Government purposes without the payment of any royalties thereon or therefore.

FIELD

The present invention generally pertains to a vibration ring, and more specifically, to a vibration ring for removing vibratory energy from a mechanical system.

BACKGROUND

Gear induced noise in rotorcraft typically exceeds 100 dB, making it impossible to communicate without headsets. This has limited the use of rotorcraft for civilian transportation. The rotorcraft driveline system includes several sets of gears, which generate high frequency vibration as the gear teeth make contact. Once this vibration exits the driveline, it transfers to the passenger cabin and generates structure borne noise.

Further, the mechanical connections to the driveline system are responsible for suspending the passenger cabin in the air. These connections are critical, and therefore, soft isolation mounts cannot be employed to prevent the vibration transfer. Vibration damping and noise barriers on the cabin walls would be effective, but require more mass than is allowable for this type of aircraft. In this situation, reducing vibration within the driveline has proven to be the most viable option.

Currently, the most effective driveline modifications have been to redesign the gear tooth profiles and surface features. By making these changes, the transfer of motion through the gears has become smoother and hence less vibration is generated. This has led to global reductions in vibration and structure borne noise.

However, gear tooth modifications have not eliminated the problem. Noise in rotorcraft is still overwhelming, requiring the use of headsets for communication and creating an environment that prevents widespread use of rotorcraft for civilian transportation.

Thus, an alternative approach to solving this problem may be beneficial.

SUMMARY

Certain embodiments of the present invention may be implemented and provide solutions to the problems and needs in the art that have not yet been fully solved by conventional driveline modification systems. For example, a vibration ring may be used to remove vibration energy from a machine driveline. The vibration ring may include a compression cage. The compression cage acts as a ring-shaped mechanical amplifier such that forces imparted at any position around its perimeter are transferred to an energy conversion material in an axial direction. This allows for the use of piezoelectric material and other anisotropic materials, which are optimized to convert vibration energy along one axis.

In one embodiment, a vibration ring includes a compression cage configured to act as a ring-shaped mechanical amplifier to generate vibratory excitation within a material.

In another embodiment, a compression cage includes an outer hoop and an inner hoop. The compression cage also includes a plurality of angled links configured to suspend a material within the compression cage, such that an axial force is applied to the material when a vibratory force is applied to the outer hoop or inner hoop.

In yet another embodiment, an apparatus includes a vibration ring that removes vibratory energy and produces electrical energy from the vibratory energy. The vibration ring includes a ring-shaped mechanical amplifier surrounding a material.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 2A through 2C are cross-sectional views illustrating a vibration ring, according to an embodiment of the present invention.

DETAILED DESCRIPTION OF THE EMBODIMENTS

Embodiments of the present invention pertain to a vibration ring for removing vibratory energy from a driveline system.

In one embodiment, the vibration ring includes a compression cage, an annular piezoelectric material that has been poled in the axial direction, and an electric circuit. The compression cage includes inner and outer hoops (or walls), and a series of angled links within the inner and outer hoops. The links suspend the piezoelectric material between the hoops. An electric circuit is electrically connected to electrodes of the piezoelectric material and resides within the structure of the compression cage.

During operation, when the hoops of the compression cage are moved closer to each other in response to applied vibratory force, the mechanical links press inward and create a net axial compressive force on the piezoelectric material. Compression of the piezoelectric material generates electric charge. The electric charge is converted to heat by resistive elements within the electric circuit. As a result, vibratory energy is converted to heat energy.

Figure 1:
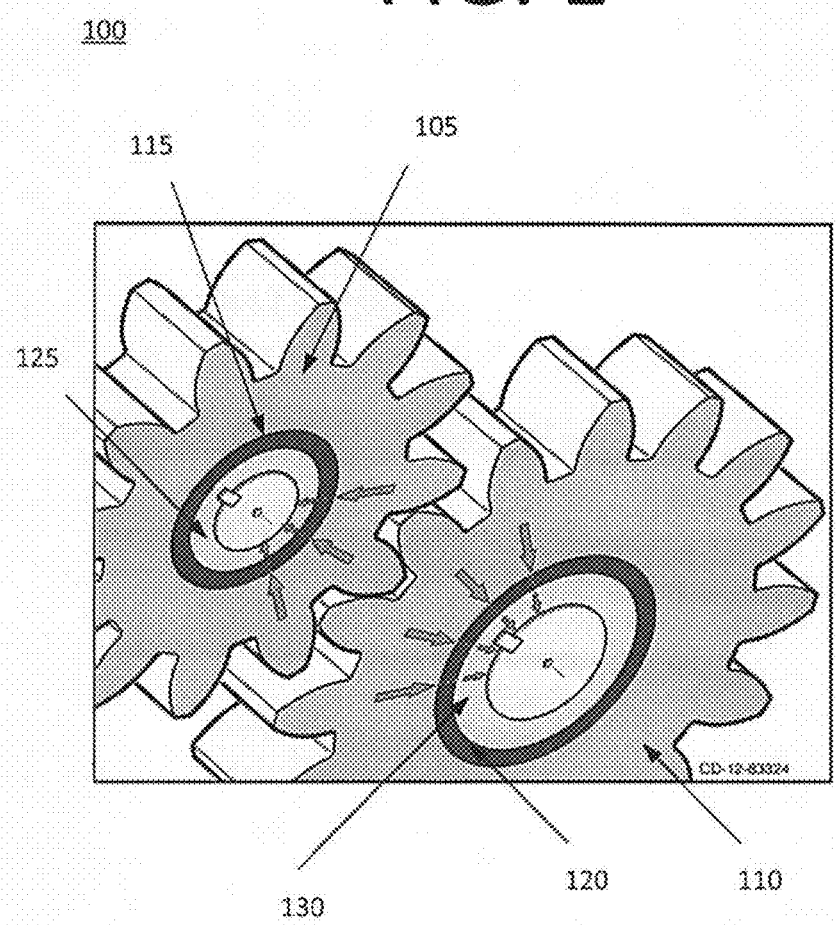
FIG. 1 illustrates a gear system including vibration rings, according to an embodiment of the present invention.

FIG. 1 illustrates a gear system 100 including vibration rings 115, 120, according to an embodiment of the present invention. In this embodiment, gear system includes gears 105, 110. Gears 105, 110 include vibration rings 115, 120. In this embodiment, vibration rings 115, 120 may be respectively placed between shafts 125, 130 and gears 105, 110. In other embodiments, vibration rings 115, 120 may be placed in between a bearing and a mechanical housing or between any two mechanical components in a driveline.

When gears 105, 110 are in motion, vibrations may occur as depicted by the arrows shown in FIG. 1. In one embodiment, vibration rings 115, 120 are used to attenuate vibration created by meshing gears 105, 110. Vibration rings 115, 120 indirectly provide a damping effect by converting applied vibratory energy into electricity and then into heat. This implies that gear system 100 with vibration rings 115, 120 will have lower vibration levels compared to the same system without the vibration rings.

Vibration rings 115, 120 are self-contained, installed like a metal spacer, and require no external wiring. By including vibration rings 115, 120 within the driveline, vibration is attenuated before the vibration is able to manifest as noise elsewhere in the machine. Stated differently, unlike conventional modification systems, vibration rings 115, 120 address the source of the problem.

Vibration rings 115, 120 may attenuate vibration energy with very little deformation. This makes them appropriate for use within the driveline of a rotating machine, i.e., vibration rings 115, 120 do not disrupt the position tolerances of the driveline assembly or significantly reduce the resonant frequencies of the driveline.

Furthermore, vibration rings 115, 120 may be used to harvest electrical energy in the rotating frame of the machine. Typical energy harvesting devices are attached to non-rotating vibrating structures, and any energy supplied to the rotating frame is transferred through slip rings. Vibration rings 115, 120 may be included within the driveline to provide energy for sensors, telemetry, and other devices within the rotating frame.

Additionally, the driveline is a concentrated source of vibration energy. Therefore, vibration rings 115, 120 may provide more electrical energy than other energy harvesting devices attached to vibrating machine structures outside of the driveline.

Figure 2A:
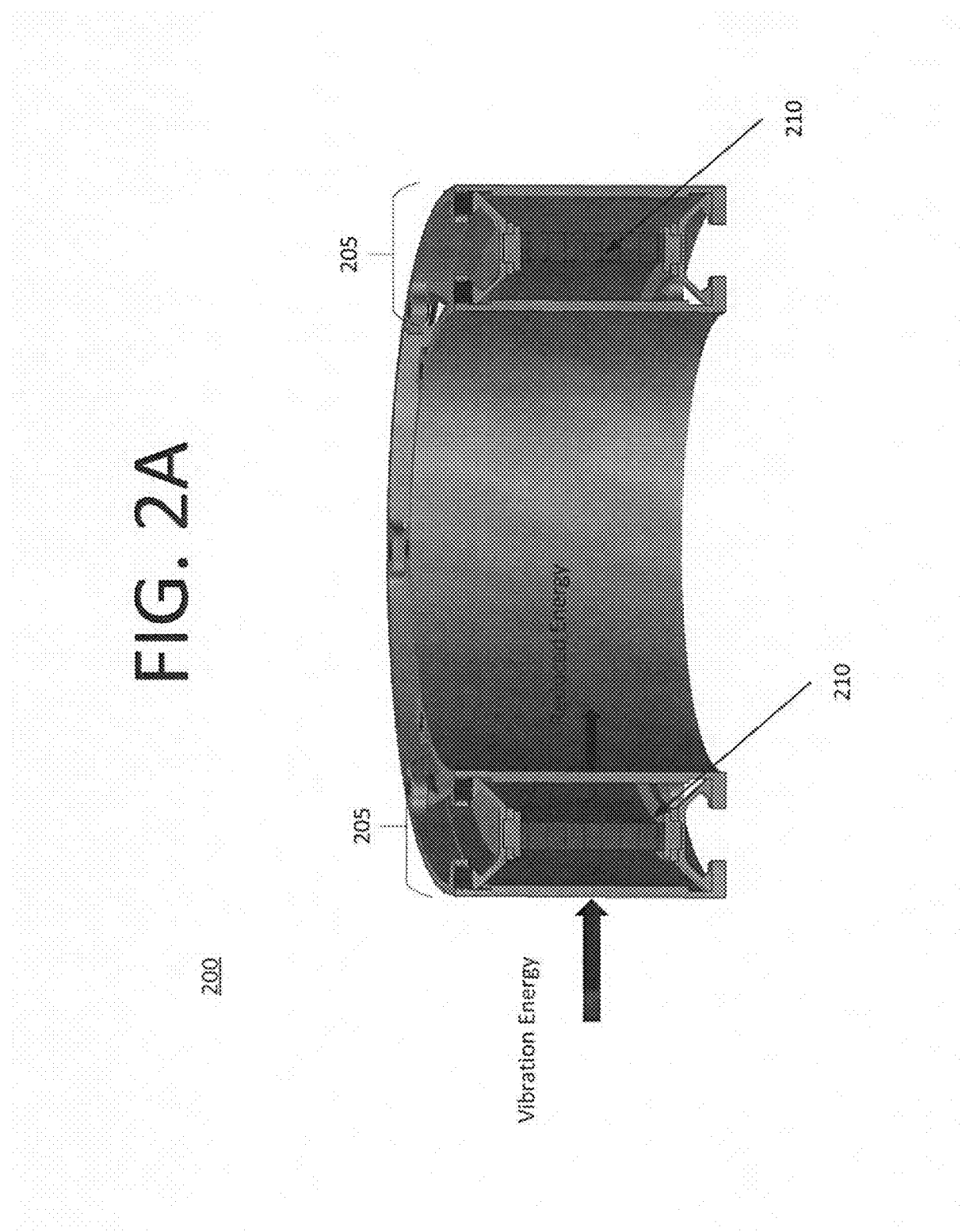

FIGS. 2A and 2B are cross-sectional views illustrating a vibration ring 200, according to an embodiment of the present invention. In particular, FIGS. 2A and 2B show that vibration energy enters vibration ring 200 and becomes reduced energy. FIG. 2A shows a vibration ring 200 having a compression cage 205 and a piezoelectric material (or stacked material) 210. FIG. 2B shows a cross-sectional view of vibration ring 200 having a compression cage 205, piezoelectric material 210, and an electric circuit 215.

Referring to FIG. 2B, compression cage 205 includes inner hoop 225 and outer hoop 220, and a plurality of mechanical links 230, 235 arranged in pairs. Vibratory forces imparted at any position around the perimeter of compression cage 205 are transferred through one or more pairs of links 230, 235 into an axial direction, causing piezoelectric material 210 to compress dynamically. Stated differently, when vibration is imparted onto outer hoop 220 of vibration ring 200, compression cage 205 changes the direction of the vibration in an axial direction. This allows the use of piezoelectric material 210, or other anisotropic materials, which are optimized to convert vibration energy along one axis. As a result, the vibratory energy is reduced.

It should be appreciated that, not only does compression cage 205 transfer vibratory force to the axial direction, but also protects material 210 from potentially damaging tensile and shear forces. This is crucial for piezoelectric materials, because they tend to be fragile in tension and shear. Compression cage 205 may prevent tensile forces by holding material 210 under a compressive preload. In addition, compression cage 205 may prevent shear forces by shunting the driveline torque between inner hoop 225 and outer hoop 220, via links 230, 235, such that the torque is not transferred through material 210.

In this embodiment, a single annular shaped material 210 is used to convert vibration energy. See, for example, FIG. 2A. However, a plurality of individual material elements may be used in its place. The elements may be bars, cylinders, or both. In a further embodiment, the elements may have any geometric shape that would be appreciated by a person of ordinary skill in the art.

Figure 3:
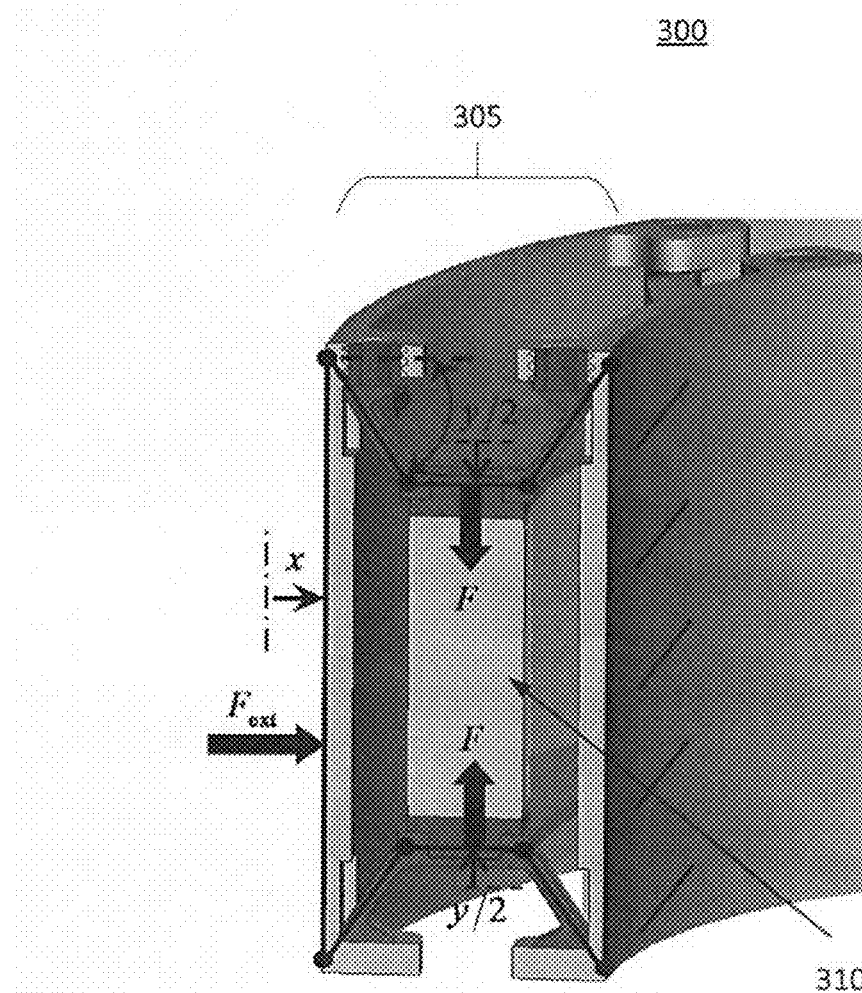
FIG. 3 is a cross-sectional view illustrating a vibration ring in a loaded state, according to an embodiment of the present invention. Certain kinematic features and forces have been annotated, for reference.

FIG. 3 is a cross-sectional view illustrating a vibration ring 300 in a loaded state according to an embodiment of the present invention. A simplified model is presented herein by reference to the kinematic features and forces annotated in FIG. 3. The model is used to provide design insight.

Assuming an external radial force $F_{ext}$ and resulting displacement x, the complex valued stiffness of vibration ring 300 is defined in the frequency domain as follows.

$$\tilde{k}_{vr} = \frac{F_{ext}}{x} \qquad \text{Equation (1)}$$

This is rewritten in the following standard form.

$$\tilde{k}_{vr} = k_{vr}(1 + j\eta_{vr}) \qquad \text{Equation (2)}$$

In this case, $k_{vr}$ and $\eta_{vr}$ are the stiffness and loss factor properties, respectively. The constant j is the square root of negative one.

In a driveline application, high loss factor is a desirable feature for damping, while high stiffness is required to prevent excessive motion that may disrupt the driveline operation.

Considering compressive force F transferred to material 310 inside of vibration ring 300 and the resulting compressive displacement y, the complex material stiffness is defined as follows.

$$\tilde{k} = \frac{F}{y} \qquad \text{Equation (3)}$$

Similarly, this equation is written in the following standard form.

$$\tilde{k} = k(1 + j\eta) \qquad \text{Equation (4)}$$

In this embodiment, k and η are respectively the material stiffness and loss factor properties. In general, these are frequency dependent properties, and for the case of piezoelectric material, these properties are dependent on the impedance of the attached electric circuit.

Compression cage 305 design associates material 310 and vibration ring 300 properties by the following two factors.

$$G = 1 + \frac{\cos 2\phi_{unload}}{\sin^2 \phi_{unload}} \qquad \text{Equation (5)}$$

$$\alpha = \frac{k_{cage}}{k_{vr}} \qquad \text{Equation (6)}$$

The factor G is a trigonometric function of $\phi_{unload}$, which is the link angle φ, as shown in FIG. 3, for the case that no load is applied. The factor α is defined as the ratio of compression cage 305 stiffness $k_{cage}$, and vibration ring 300 stiffness. Compression cage 305 stiffness is the effective vibration ring 300 stiffness when material 310 is removed, i.e., it's the stiffness of the structure alone. Given these definitions, the properties of vibration ring 300 are related to the properties of material 310 as follows.

$$k_{vr} = \frac{k \cdot G}{1 - \alpha} \quad \text{Equation (7)}$$

$$\eta_{vr} = (1 - \alpha)\eta \quad \text{Equation (8)}$$

Equations (7) and (8) show that the stiffness and loss factor of the vibration ring 300 are proportional to the stiffness and loss factor of material 310 inside. Therefore, for driveline damping, material 310 should have high stiffness and loss factor. This combination of properties is available in certain piezoelectric materials, such as piezoceramic or single-crystal type, when their electrical terminals are shunted by a resistive circuit.

Equations (7) and (8) also indicate that stiffness may be tuned by adjusting the link angle, and that factor $\alpha$ should be minimized to produce the greatest damping.

Returning to FIG. 2B, minimizing factor $\alpha$ of the vibration ring configuration requires links 230, 235 to have low bending stiffness and high longitudinal stiffness. FIG. 2C shows a modification to achieve this goal. For example, each link 230, 235 is replaced by a pair of links to augment longitudinal stiffness, while the ends of the links are thinner to reduce bending stiffness.

It should be noted that compression cage may take on a variety of configurations, including various link orientations, attachment methods, and geometries. The configuration is dependent upon the forces imparted to the vibration ring, the geometric constraints, the type and arrangement of the energy conversion material, and other application specific factors.

While piezoelectric material 210 is used in this embodiment, other types of passive material may be used in other embodiments. For example, passive material, which generates heat in response to deformation (e.g. viscoelastic or hysteretic damping materials), may be substituted in placed of piezoelectric material 210. In these embodiments, electric circuit 215 is not required.

It should also be appreciated that magnetostrictive material, which generates a magnetic field in response to stress, may be substituted in place of piezoelectric material 210. In such an embodiment, a charge would be generated by wrapping a coil of wire around the induced magnetic field. Electric circuit 215 would be connected to the wire to dissipate the electrical energy.

It should be further appreciated that in some embodiments, electric circuit 215 acts as a power generation circuit, and stores harvested energy in a battery or another system within the machine.

In summary, the vibration ring is configured to remove vibratory energy from a driveline to achieve vibration reduction and/or generate power. The vibration ring includes a ring-shaped mechanical amplifier, called the compression cage, surrounding a ring shaped piezoelectric material that is poled in the axial direction. The compression cage is configured with a plurality of angled links to apply axial compressive force to the piezoelectric material when radial force is applied anywhere around the perimeter of the vibration ring. In response to compression, the piezoelectric material generates electrical energy which is dissipated or harvested by an electric circuit.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that embodiments of the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A driveline assembly, comprising:
a gear comprising an inner surface defining an opening;
a rotating shaft disposed within the opening; and
a ring-shaped compression cage disposed within the opening between the inner surface and the rotating shaft, wherein the ring-shaped compression cage comprises:
a compression cage including a first curved surface and a second curved surface defining circumferential boundaries of an annular-shaped volume surrounding a central axis of the compression cage;
a plurality of angled links, wherein each of the angled links extends from the first curved surface to the second curved surface, wherein the angled links are angled with respect to the central axis such that the angled links redirect radial forces imparted on the compression cage in a direction parallel to the central axis; and
a material suspended within the annular shaped volume by the angled links, wherein the material is attached to the angled links so as to receive redirected radial forces therefrom.

2. The driveline assembly of claim 1, wherein the compression cage is configured to protect the material from damaging tensile forces, shear forces, or both.

3. The driveline assembly of claim 1, wherein the material is configured to generate heat in response to force from the compression cage.

4. The driveline assembly of claim 1, wherein the material comprises
magnetostrictive material configured to generate a magnetic field in response to force from the compression cage, or
piezoelectric material configured to generate electric charge in response to force from the compression cage.

5. The driveline assembly of claim 1, wherein an electric circuit is connected to electrodes of the material or an electromagnetic coil surrounding the material.

6. The driveline assembly of claim 5, wherein the electric circuit is configured to harvest a generated electric charge.

7. The driveline assembly of claim 5, wherein the electric circuit comprises resistive elements configured to convert the generated electric charge to heat.

8. The driveline assembly of claim 1, wherein the compression cage is configured to create a compressive force in an axial direction on the material when external force causes walls of the compression cage to compress.

9. The driveline assembly of claim 1, wherein the material is annular.

10. The driveline assembly of claim 1, wherein the plurality of angled links comprises a plurality of sets of angled links, wherein each of the plurality of sets of angled links comprises:
a first angled link disposed proximate to a first end of the annular-shaped volume at an azimuthal position within the annular-shaped volume, wherein the first angled link includes angled portions extending at angles to the central axis, wherein one of the angled portions directly contacts and extends from the first curved surface and the other one of the angled portions directly contacts and extends from the second curved surface, wherein the angled portions are connected such that the first angled link extends an entirety of a radial distance between the first and second curved surfaces;
a second angled link disposed proximate to the second end at the same azimuthal position within the annular-shaped volume, wherein the second angled link is separate from the first angled link, wherein the second angled link includes angled portions extending at angles to the central axis, wherein one of the angled portions directly contacts and extends from the first curved surface and the other one of the angled portions directly contacts and extends from the second curved surfaces, wherein the angled portions are connected such that the second angled link extends the entirety of the radial distance between the first and second curved surfaces; and
an axial gap extending between the first and second angled links, wherein the material extends in the axial gap between the first and second angled links.

11. The driveline assembly of claim 10, wherein the angled portions are the only points of contact between the first and second angled links and the first and second curved surfaces.

12. A driveline assembly, comprising:
a gear comprising an inner surface defining an opening;
a rotating shaft disposed within the opening; and
a ring-shaped compression cage disposed within the opening between the inner surface and the rotating shaft, wherein the ring-shaped compression cage comprises:
a first hoop;
a second hoop located concentrically inward of the first hoop, wherein the first and second hoops circumferentially surround a central axis;
a plurality of angled links extending between the first hoop and the second hoop, wherein each of the angled links includes first angled portion extending from the first hoop, a second angled portion extending from the second hoop, and a mounting portion connecting the first angled portion to the second angled portion, wherein the mounting portions of the plurality of angled links define a mounting surface configured to suspend a material between the first hoop and the second hoop, wherein the first and second angled portions of the plurality of angled links are tilted with respect to the central axis such that radial forces imparted on the first hoop towards the central axis are redirected and the material receives an axial force in the direction of the central axis.

13. The driveline assembly of claim 12, wherein the ring-shaped compression cage is configured to protect the material from damaging tensile forces, shear forces, or both.

14. The driveline assembly of claim 12, wherein the material is configured to generate heat in response to force from the ring-shaped compression cage.

15. The driveline assembly of claim 12, wherein the material comprises
magnetostrictive material configured to generate a magnetic field in response to force from the ring-shaped compression cage, or
piezoelectric material configured to generate electric charge in response to force from the ring-shaped compression cage.

16. The driveline assembly of claim 12, wherein an electric circuit is connected to the electrodes of the material or an electromagnetic coil surrounding the material.

17. The driveline assembly of claim 16, wherein the electric circuit is configured to harvest a generated electric charge.

18. The driveline assembly of claim 16, wherein the electric circuit comprises resistive elements configured to convert the generated electric charge to heat.

19. The driveline assembly of claim 12, wherein the material is annular.

20. The driveline assembly of claim 12, wherein the ring-shaped compression cage is configured to create a compressive force in an axial direction on the material when external force causes walls of the compression cage to compress.

* * * * *